United States Patent [19]

Bachman

[11] Patent Number: 4,869,565

[45] Date of Patent: Sep. 26, 1989

[54] UNIVERSALLY ADJUSTABLE DISPLAY APPARATUS

[76] Inventor: Carolyn S. Bachman, 11139B East Rd., Palos Hills, Ill. 60465

[21] Appl. No.: 316,152

[22] Filed: Feb. 27, 1989

[51] Int. Cl.⁴ ............................................. A47B 81/00
[52] U.S. Cl. .................................... 312/234; 312/7.2; 248/918
[58] Field of Search ............................ 248/447.1, 1 B; 312/7.2, 233, 234

[56] References Cited

U.S. PATENT DOCUMENTS

| | | | |
|---|---|---|---|
| 4,128,286 | 12/1978 | Windisch et al. | 312/234 |
| 4,632,471 | 12/1986 | Visnapuu | 312/233 |
| 4,693,443 | 9/1987 | Drain | 248/447.1 |
| 4,756,580 | 7/1988 | Middleton | 312/7.2 |

Primary Examiner—Joseph Falk
Attorney, Agent, or Firm—Dick and Harris

[57] ABSTRACT

A universally adjustable display apparatus for fitment about and affixation to the housing of a computer monitor screen, for provision of indicia bearing surfaces substantially parallel to the front surface of the monitor screen. The display apparatus consists of two L-shaped display members with variable attachment means which permit overlapping attachment of the two display members while enabling the display apparatus to be horizontally expanded and contracted for adjustment to any width monitor screen housing.

13 Claims, 1 Drawing Sheet

U.S. Patent
Sep. 26, 1989
4,869,565
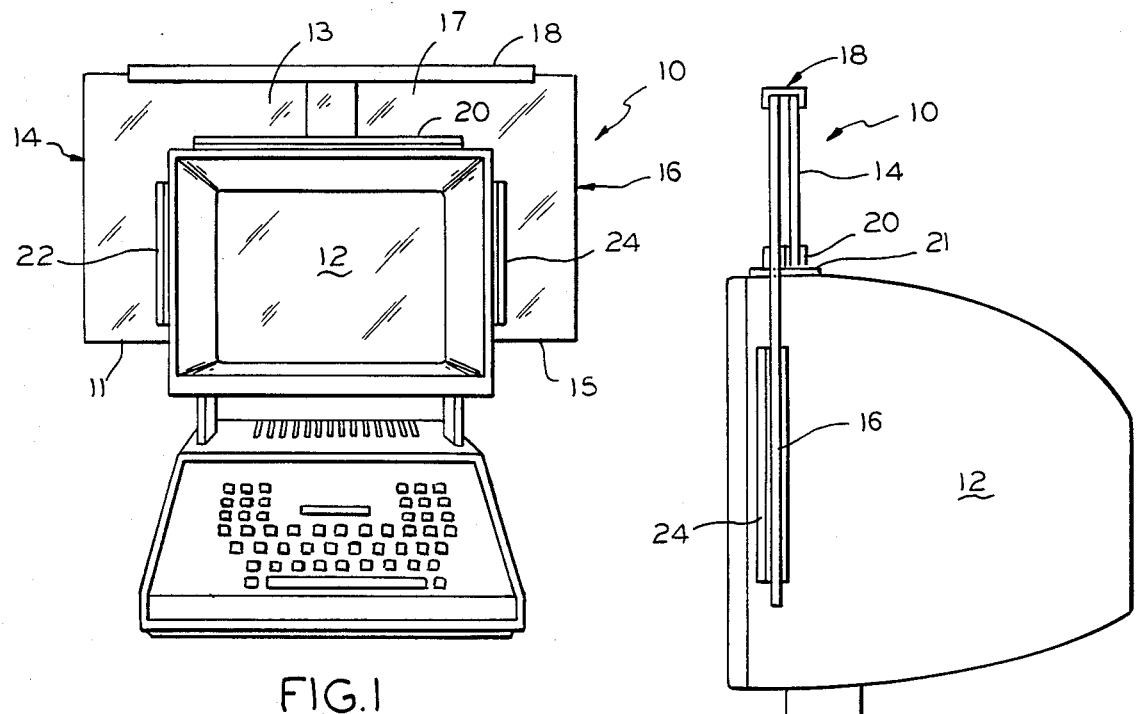
FIG.1
FIG.2
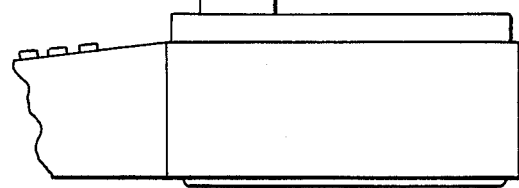
FIG.3
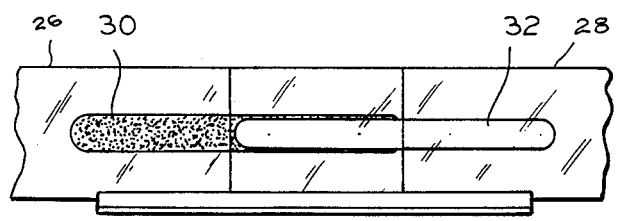
FIG.4
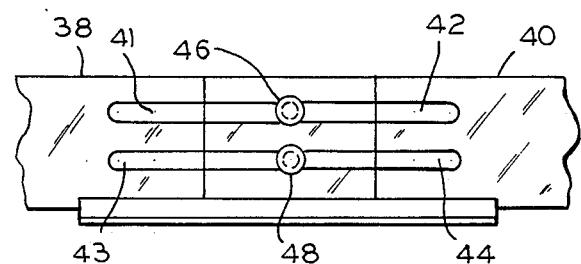
FIG.5

UNIVERSALLY ADJUSTABLE DISPLAY APPARATUS

BACKGROUND OF THE INVENTION

The present invention relates generally to computer monitor display apparatus and in particular to a universally adjustable display apparatus for fitment about and affixation to the housing of a computer monitor screen, for the provision of indicia bearing surfaces substantially parallel to the front surface of the monitor screen.

With the prevalence of conventional personal computers, there are thousands of computer inputs that are used by computer operators. Since they cannot all be memorized, the computer user constantly has to refer to manuals to find the correct input. Accordingly, computer operators often make notes of often-used but difficult to memorize inputs, to avoid referring to the manual.

Computer monitor screens currently in use today have very little space around the periphery of the actual screen to which this indicia can be affixed for instruction or reference for use by the computer operator. The user accordingly affixes such indicia in hard-to-see places such as the top or sides of the monitor screen housing, other locations around the user's office space, or even on the screen itself.

Hence, an object of the proposed invention is to provide a display apparatus directly in front of the computer user to which a user can affix notes or inputs that are not memorized, in order to save time by avoiding constant searching around the desk or in reference manuals.

A further object of this invention is to provide a display apparatus which is universally adjustable for fitment about and secure affixation to any computer monitor screen housing through provision of two overlapping L-shaped display members which can be horizontally expanded and contracted to adjust to the width of a specific computer monitor screen housing.

Yet another object of this invention is to provide a display apparatus which does not interfere with the use of the computer, while being substantially inexpensive to manufacture and assemble. Since the display apparatus is positioned along the outer periphery of the computer monitor screen housing, it does not interfere with the operation of the computer.

These and other objects of the invention will become apparent upon reference to the following specification drawings and claims.

SUMMARY OF THE INVENTION

The present invention comprises a universally adjustable display apparatus for fitment about and affixation to the housing of a computer monitor screen. The display apparatus provides an indicia bearing surface which is substantially parallel to the front surface of the monitor screen.

The display apparatus itself comprises a first substantially flat L-shaped display member which forms a first side leg member and a first top leg member as well as a second substantially flat L-shaped display member which forms a second side leg member opposite to the first side leg member and a second top leg member for variable affixation to the first top leg member.

The top leg members are affixed to one another by variable top leg attachment means which permit the overlapping variable attachment of the first and second top leg members while simultaneously juxtaposing the inside edges of the first and second side leg members to the corresponding substantially opposite vertical edges of the monitor screen housing. The variable top leg attachment means further enable the display apparatus to be horizontally expanded and contracted to closely juxtapose the inside edges of the side leg members to the corresponding substantially opposite vertical edges of the monitor screen housing.

The display apparatus further includes monitor attachment means for variably affixing one or more of the bottom edges of the top leg members and the respective inside edges of the side leg members to the corresponding top surface and substantially opposite vertical edges of the monitor screen housing respectively.

In the preferred embodiment of the invention, the variable top leg attachment means comprises at least one longitudinal channel member for receipt and retention of at least one of the top and bottom edges respectively of the first and second top leg members. In this embodiment, the monitor attachment means comprises the longitudinal channel member being affixed to the bottom edges of the top leg members while permitting reciprocation therebetween. The longitudinal channel members are further adhesively bonded to the corresponding top surface of the monitor screen housing.

In one preferred embodiment of the apparatus, the monitor attachment means comprises longitudinal channel members for receipt and retention of the inner edges of the first and second side leg members in juxtaposition with the corresponding substantially opposite vertical edges of the monitor screen housing. The longitudinal channel members are adhesively bonded to the corresponding respective vertical edges of the monitor screen housing.

In another preferred embodiment of the apparatus, the monitor attachment means comprises strips which adhere when mated, for example Velcro for maintaining the inner edges of the first and second side leg members in attached juxtaposition with the mated strips aligned on the substantially opposite vertical edges of the monitor screen housing. The Velcro strips are adhesively bonded to the inner edges of the side leg members and the corresponding vertical edges of the monitor screen housing.

In another preferred embodiment of the invention, the monitor attachment means comprises one or more strips which adhere when mated affixed to the bottom edges of the first and second top leg members in juxtaposition with aligned strips on the corresponding top surface of the monitor screen housing. The strips on the bottom edges of the first and second top leg members are adhesively bonded to the bottom edges of the top leg members and the mated aligned strips are adhesively bonded to the corresponding top surface of the monitor screen housing.

In this preferred embodiment of the invention, the variable top leg attachment means comprises longitudinal channel members which are operably positioned at both the top and bottom edges of the first and second top leg members, to provide for adjustable affixation between the two top leg members.

In another preferred embodiment of the invention, the variable top leg attachment means comprises aligned substantially horizontal slots in each of the first and second top leg members with biasing connectors located within these slots which may be alternatively compressed and released to provide for adjustable affixation between the two leg members.

In yet another preferred embodiment of the invention, the variable top leg attachment means comprises mated aligned fastener strips which adhere when mated which are operably located along each of the first and second top leg members to provide for adjustable affixation between the two top leg members. for adjustable affixation between the two top leg members.

In still another preferred embodiment of the display apparatus, the variable top leg attachment means comprises the slidable and telescopic receipt of the first top leg member within at least a portion of the second top leg member for adjustable affixation between the two top leg members. One of the top leg members further includes a substantially horizontal longitudinal slot to receive a fastener while the other top leg member includes an aperture operably positioned in line with the longitudinal slot to receive the fastener.

Preferably, the first and second substantially L-shaped display members are comprised of a transparent plastic so that the display apparatus may be viewed through. In another preferred embodiment, the L-shaped display members are comprised of a cork-type material in order to accomodate tacked and pinned indicia.

In the preferred embodiment of the invention, the first and second top leg members include leveling means comprising a substantially flat longitudinal strip which is affixed proximate and substantially perpendicular to the respective bottom edges of the top leg members so as to be in substantially parallel orientation to and affixation with the corresponding top surface of the monitor screen housing, to further prompt the display apparatus into a substantially upright position. The leveling strip is integrated with the bottom edges of the top leg monitor attachment means for affixation through bonding to the corresponding top surface of the monitor screen housing.

BRIEF DESCRIPTION OF THE DRAWINGS

FIG. 1 of the drawings is a front elevational view of the invention particularly showing the universally adjustable display apparatus fitted about and securely affixed to a particular computer monitor screen housing;

FIG. 2 is a side elevational view showing the monitor attachment means between the top and side legs and the computer housing, as well as the top leg attachment means positioned between the two L-shaped display members;

FIG. 3 is a partial front elevational view of an embodiment of the invention in which the L-shaped display members are attached to one another along their top legs by fastener strips which adhere when mated;

FIG. 4 is a partial front elevational view of an embodiment of the invention in which the L-shaped display members are attached to one another along their top legs by a series of slots and compressible rivets; and FIG. 5 is a partial front perspective view of an embodiment of the invention in which the L-shaped display members are attached to one another along their top legs through slidable telescopic receipt of a first top leg display member within a second top leg display member.

DETAILED DESCRIPTION OF THE DRAWINGS

While this invention is susceptible of embodiment in many different forms, there is shown in the drawings and will herein be described in detail, several specific embodiments with the understanding that the present disclosure is to be considered as an exemplification of the principals of the invention and is not intended to limit the invention to the embodiments illustrated.

The present universally adjustable display apparatus 10 is shown fitted about and affixed to computer monitor screen housing 12 in FIGS. 1 and 2. Display apparatus 10 includes first L-shaped display member 14 having side leg 11 and top leg 13 as well as second L-shaped display member 16 having side leg 15 opposite to side leg 11 of display member 14 and top leg 17 affixed to top leg 13 of display member 14. Display members 14 and 16 provide indicia bearing surfaces which are substantially parallel to one another as well as to the front surface of monitor screen housing 12. Display members 14 and 16 are further substantially juxtaposed while overlapping at top legs 13 and 17.

Display members 14 and 16 are attached to one another at top legs 13 and 17 by channel member 18 which receives and retains the top edges of top legs 13 and 17 in a parallel reciprocating configuration. Channel member 18 retains top legs 13 and 17 in parallel juxtaposition while allowing display members 14 and 16 to be horizontally expanded and contracted to closely juxtapose the inside edges of side legs 11 and 15 to the corresponding vertical edges of monitor screen housing 12 for adjustment to the size of monitor screen housing 12 during fitment and affixation to same.

After the apparatus is fitted around monitor screen housing 12, it is affixed to monitor screen housing 12 at the bottom edges of top legs 13 and 17 and the inside edges of side legs 11 and 15. This is accomplished by additional channel members 20, 22 and 24 which are adhesively bonded to monitor screen housing 12. Channel member 22 receives and retains the inside edge of side leg 11 and channel member 24 receives and retains the inside edge of side leg 15. Channel member 20 receives and retains the bottom edges of top legs 13 and 17 in the same juxtaposed parallel reciprocating configuration as channel member 18 to both affix top legs 13 and 17 to one another as well as to the top surface of monitor screen housing 12. While having both channel members 18 and 20 is not necessary to securely affix top legs 13 and 17 to one another, their combination provides greater stability.

If permanent affixation between top legs 13 and 17 is desired, adhesive may be applied between either or both of the top and bottom edges of top legs 13 and 17 and channel members 18 and 20 respectively. If continued reciprocation between top legs 13 and 17 is instead desired for continuous adjustability to various sizes of monitor screen housings, the top and bottom edges of top leg members 13 and 17 need not be adhesively bonded to channel members 18 and 20 respectively.

Likewise, if permanent affixation between display apparatus 10 and monitor screen housing 12 is desired, adhesive may be applied between channel member 20 and the bottom edges of top legs 13 and 17, as well as between channel members 22 and 24 and the inside edges of side legs 11 and 15 respectively. If mobility is desired, such as transferring display apparatus 10 from monitor screen housing 12 to another monitor screen housing, the bottom edges of top legs 13 and 17 and the inside edges of side legs 11 and 15 need not be adhesively bonded to channel members 20, 22 and 24 respectively. Furthermore, instead of channel members 20, 22 and 24, mobility between monitor screen housings could also be achieved by affixing fastener strips which adhere when mated to the bottom edges of top legs 13 and 17 and the inside edges of side legs 11 and 15 which correspond to opposing aligned fastener strips affixed to the top surface and opposite vertical edges respectively of monitor screen housing 12.

Again, while having all of channel members 20, 22 and 24 are not necessary to securely affix display apparatus 10 to monitor screen housing 12, their combination provides greater stability.

Leveling strip 21, as shown in FIG. 2, is integrated with the bottom edge of channel member 20 proximate and substantially perpendicular to the respective bottom edges of top legs 13 and 17 so as to be in substantially parallel orientation to and affixation with the top surface of monitor screen housing 12, to further prompt display apparatus 10 in a substantially upright position parallel to the front surface of monitor screen housing 12. The top of leveling strip 21 is adhesively bonded to the bottom edge of channel member 20 and the bottom of leveling strip 21 is adhesively bonded to the top surface of monitor screen housing 12.

Display members 14 and 16 may be constructed out of a transparent plastic so that display apparatus 10 may be viewed through. Alternatively, display members 14 and 16 may be constructed out of cork-type material in order to accomodate tacked and pinned indicia. Additionally, accessories may be attached to display members 14 and 16 such as a clip, similar to the clip used on a clip-board, for the clipped retention of notes and documents.

FIG. 3 shows an alternative embodiment of the universally adjustable display apparatus in which fastener strips which adhere when mated 30 and 32 are utilized to affix the top leg members 26 and 28 to one another. Top leg 26 includes fastener strip 30 for mated aligned affixation with fastener strip 32 on top leg 28.

FIG. 4 shows another alternative embodiment for attaching the display members. Top leg 38 includes substantially parallel horizontal slots 41 and 43. Top leg 40 includes substantially parallel horizontal slots 42 and 44 aligned respectively with slots 41 and 43 of top leg 38. Rivet type fasteners 46 and 48 which may be alternatively compressed and released are located in aligned slots 41-42 and 43-44 respectively in the overlapping region of top legs 38 and 40 to affix top leg 38 to top leg 40 in a juxtaposed parallel reciprocating configuration.

Yet another alternative means of adjustably affixing top legs of respective display members to one another is shown in FIG. 5. Top leg 54 includes substantially horizontal slot 58 and is capable of slidable and telescopic receipt within groove 57 of top leg 56. Top leg 56 further includes aperture 59 aligned with slot 58 of top leg 54 for receipt of a fastener such as wing nut 60, after top legs 54 and 56 have been adjustably positioned.

The foregoing description and drawings merely explain and illustrate the invention and the invention is not limited thereto, except insofar as the amended claims are so limited, as those skilled in the art who have the disclosure before them will be able to make modifications and variations therein without departing from the scope of the invention. By way of example, channel members 20, 22 and 24 are contemplated by the invention as embodying independent attachable elements or alternatively may be integrated into their respective leg assemblies as one integrated structure.

What is claimed is:

1. A universally adjustable display apparatus for fitment about and affixation to the housing of a computer monitor screen, for provision of indicia bearing surfaces substantially parallel to the front surface of said monitor screen, said universally adjustable display apparatus comprising;

a first substantially flat L-shaped display member forming a first side leg member and a first top leg member, a second substantially flat L-shaped display member forming a second side leg member opposite to said first side leg member and a second top leg member for variable affixation to said first top leg member, variable top leg attachment means affixed to each of said first and said second top leg member for variable affixation therebetween, said variable top leg attachment means permitting overlapping variable attachment of said first and second top leg members while simultaneously juxtaposing the inside edges of said first and second side leg members to the corresponding substantially opposite vertical edges of said monitor screen housing, said variable top leg attachment means between said first and second top leg members further enabling said display apparatus to be horizontally expanded and contracted to closely juxtapose the inside edges of said first and second side leg members to the corresponding substantially opposite vertical edges of said monitor screen housing, and monitor attachment means for variably affixing one or more of the bottom edges of said first and second top leg members and the respective inside edges of said first and second side leg members to the corresponding peripheral region of said top surface and said substantially vertical edges of said monitor screen housing respectively.

2. The invention according to claim 1 in which said variable top leg attachment means comprises at least one longitudinal channel member to provide receipt and retention of at least one of said top and bottom edges respectively of said first and second top leg members.

3. The invention according to claim 1 in which said monitor attachment means comprises a longitudinal channel member being affixed to said bottom edges of said first and second top leg members while permitting reciprocation therebetween, said longitudinal channel member being further adhesively bonded to said corresponding top surface of said monitor screen housing.

4. The invention according to claim 1 in which said monitor attachment means comprises longitudinal channel members to provide receipt and retention of said inner edges of said first and second side leg members in juxtaposition with the corresponding substantially opposite vertical edges of said monitor screen housing, said longitudinal channel members being adhesively bonded to said corresponding respective vertical edges of said monitor screen housing.

5. The invention according to claim 1 in which said monitor attachment means comprises strips which adhere when mated for maintaining said inner edges of said first and second side leg members in attached juxtaposition with said mated strips aligned on the substantially opposite vertical edges of said monitor screen housing,
  said strips being adhesively bonded to said inner edges of said first and second side leg members and said corresponding vertical edges of said monitor screen housing.

6. The invention according to claim 1 in which said monitor attachment means comprises one or more strips which adhere when mated affixed to the bottom edges of said first and second top leg members in juxtaposition with aligned strips on the corresponding top surface of said monitor screen housing,
  said strips on said bottom edges of said first and second top leg members being adhesively bonded to said bottom edges of said first and second top leg members, with said mated aligned strips bonded to said corresponding top surface of said monitor screen housing.

7. The invention according to claim 1 in which said variable top leg attachment means comprises longitudinal channel members operably positioned at both the top and bottom edges of said first and second top leg members, to provide for adjustable affixation therebetween.

8. The invention according to claim 1 in which said variable top leg attachment means comprises aligned substantially horizontal slots in each of said first and second top leg members,
  said variable top leg attachment means further including biasing connectors located within said slots which may be alternatively compressed and released to provide for adjustable affixation therebetween.

9. The invention according to claim 1 in which said variable top leg attachment means comprises mated aligned fastener strips which adhere when mated operably located along each of said first and second top leg members so as to enable adjustable affixation therebetween.

10. The invention according to claim 1 in which said variable top leg attachment means comprises said first top leg member being slidably and telescopically received within at least a portion of said second top leg member for adjustable affixation therebetween,
  one of said first and second top leg members further including a substantially horizontal longitudinal slot to receive a fastener,
  the other of said first and second top leg members further including an aperture operably positioned in line with said longitudinal slot to receive said fastener therewithin.

11. The invention according to claim 1 in which said first and second substantially L-shaped display members are comprised of a transparent material to enable viewing through said apparatus.

12. The invention according to claim 1 in which said first and second substantially L-shaped display members are comprised of a cork-type material to provide for the accomodation of tacked and pinned indicia thereon.

13. The invention according to claim 1 in which said first and second top leg members include leveling means comprising a substantially flat longitudinal strip affixed proximate and substantially perpendicular to the respective bottom edges of said first and second top leg members so as to be in substantially parallel orientation to and affixation with said corresponding top surface of said monitor screen housing, to further prompt said display apparatus into a substantially upright position,
  said leveling strip being integrated with the bottom edges of the first and second top leg monitor attachment means, for affixation through bonding to said corresponding top surface of said monitor screen housing.

* * * * *